Patented Feb. 17, 1942

2,273,100

UNITED STATES PATENT OFFICE 2,273,100

CONDENSATION PRODUCTS

Anthony H. Gleason, Elizabeth, N. J., assignor to Standard Oil Development Company, a corporation of Delaware No Drawing. Application March 5, 1936, Serial No. 67,369

9 Claims. (Cl. 260—618)

The present invention relates to substances having wax modifying properties which may be used to reduce the pour point of oils and to assist in the removal of waxy constituents from oils containing the same.

The present application is a continuation in part of a prior application, Serial No. 618,473, filed June 21, 1932, now Patent 2,106,247.

It has been found that there are certain classes of substances which have the power of modifying crystal form or growth of the waxy constituents of lubricating oils so as to prevent solidification or congelation of the oil at its normal pour point. In this way an oil which normally becomes solid at say 30°, or 40° or 50° or even 75° F. may be caused to remain liquid even as low as 15° or 10°, or 0° F. or below, without removal of any of the wax therefrom. The present invention relates to a new class of substances which possesses both of the two enumerated properties to a more or less substantial degree.

The materials which form the basis of the present invention are condensation products of various compounds. The condensation is carried out with the assistance of aluminum chloride, zinc chloride, boron fluoride or other known condensation agents of this class and ordinarily at room temperatures such as 70° to 100° F. and generally not above say, 250° to 300° F., although the allowable limits may vary somewhat when different materials are used. If desired, solvents may be used during the condensation and for that purpose highly saturated kerosene or heavy naphtha, or other solvent may be used. If polymerization goes too far, insoluble materials of a rubbery character result which are, of course, undesirable. This may be prevented by limiting the time of reaction and by addition of saturated acids, esters, alcohols and the like to the reaction mixture.

In general, oxygen-containing aliphatic materials of the class of esters, ethers, acids, alcohols and ketones serve the present purpose. The substances of these classes which are used are those which contain relatively long hydrocarbon chains, say containing 10 or 12 carbon atoms at least, and preferably even more. The hydrocarbon chains are preferably straight or, at least, should be substantially so and should contain at least one reactive group in addition to the oxygen containing group. This reactive group may be olefinic as in the unsaturated alcohols such as oleyl or other unsaturated alcohols but the reactive group may also be a halogen for example chlorine as in the chlor-steryl alcohol.

The chlorinated or olefinic compounds may be used as such and the condensation is carried out in the same way as indicated above with the aluminum chloride type of catalysts at substantially the same temperatures mentioned. During this process a considerable amount of hydrochloric acid may be evolved. If preferred, the halogen may be removed from the material prior to condensation in any known manner such as by application of heat, preferably in the presence of such material as barium chloride so as to split off hydrochloric acid leaving unsaturated material for condensation. Unsaturated or an already partially unsaturated material may be increased in unsaturation by this or by other suitable means before condensation.

As to the particular materials which may be used, acids of the type of stearic or palmitic are suitable, but since these are saturated they should be treated as above indicated either to render them unsaturated or to make their halogen derivatives. Generally speaking, straight chain saturated acids produced by the oxidation of paraffin wax by blowing with air, preferably in the presence of catalysts of the siccative type which range from $C_{10}$ to $C_{22}$ or more, may all be used, or mixtures may be used just as the natural fatty acids would be used. Naturally unsaturated acids may also be used such as oleic, erucic, elaidic or crotonic, and highly unsaturated acids can also be used such as linoleic, or their hydroxy derivatives such as naphtholic. Likewise, the acetylenic acids such as behenolic or stearolic are suitable.

The esters of all of these acids such as methyl, ethyl or propyl esters may be used, or even higher alkyl esters such as the drying or semi-drying oils, but the reaction of such materials is so sluggish that they are not nearly so desirable as the lower alkyl esters for the present purposes. In fact, the lower alkyl esters are probably more desirable than the acids themselves. Alcohols, ketones or ethers are useful for the present purpose exactly as the esters, and the substances of this class should contain straight hydrocarbon chains of, at least, 10 or 12 carbon atoms, as indicated above. If they are already unsaturated they may be used as such, as indicated before, but if saturated they may be first halogenated or rendered unsaturated by the methods indicated above, or by similar suitable means.

The materials which have been listed above falling in the classes of acids, esters, alcohols, ethers and the like may be used alone, but it is preferable to carry out the condensation in the presence of a cyclic compound such as benzol or naphthalene or their hydrogenated or alkylated derivatives such as toluol or xylol or ethylnaphthalene, tetraline, hexaline, decaline, and the like. The presence of a hydroxy group in the cyclic substance is permissible although not specially desirable, as illustrated by the phenols and naphthols or cyclic alcohols such as cyclohexanol and the like. Nitrated aromatics can be used as well as amines such as aniline and naphthylamine. In addition to the cyclic compounds listed above, cyclic terpenes may also be used.

The condensation which is described above is more than a simple union of two molecules since very heavy polymers are sought to be produced and these materials are particularly desirable. The polymers which are to be used are those having molecular weights well above 600 and since the method produces materials of a series of molecular weights, it is difficult to say which are those responsible for this specific action. It has been found that materials of molecular weights of 1000 or 2000 and even higher are present. The crude reaction product may be purified by the ordinary methods known in the art; for example, by washing with water or alkali to remove traces of the aluminum chloride, or treated with sulphuric acid of a strength insufficient to carbonize or sulphonate, and the lighter fractions which do not possess pour depressing properties may be removed by distillation, preferably under vacuum up to a boiling point of say 475° to 575° F. (1 millimeter vacuum) so as to concentrate the valuable heavy polymers. Distillation with steam can also be used and care should be taken not to crack the product.

The exact structure of these materials after condensation is, of course, unknown but some of the oxygen is still present in the final product in addition to carbon and hydrogen and this can be demonstrated by analysis. If acids or esters are used the oxygen remains in an acidic form, that is to say, the carboxyl group is not destroyed since acid or saponification values can be obtained. This acid group may also be esterified, neutralized or otherwise modified.

The heavy polymers produced by the methods indicated above may be added to lubricating oils in order to increase their film strength on the one hand, and to reduce pour point caused by the presence of waxy constituents. The polymers can be used in wax free oils if desired, but it is generally preferred to use the material in a waxy oil with a pour point of 30° F. or higher. A part of the wax, of course, may be removed if desired, and in the case of naturally low pour oils we have found it desirable even to add substantial quantities of wax along with the addition agent so as to improve the oil in regard to its viscosity-temperature curve and at the same time maintain a low pour point. For the present purpose the amount of polymer to be added is always below 10% and generally below even 5% depending on whether a more or less concentrated material may have been produced. If a heavy polymer having an average molecular weight of say 600 to 700 is produced by distilling off light fractions, then 1 to 4% is generally sufficient to materially increase the lubricating value of the oil and to reduce its pour point by some 30° to 50° F., and in this concentration the material does not greatly increase the viscosity of the oil with which it is blended.

While many methods have been disclosed above, the preferred method is illustrated by the following example in which the preferred materials and the most satifactory conditions are used.

*Example*

To 68 parts by weight of mixed alcohols of which approximately 60% was oleyl and the remainder saturated alcohols of approximately the same molecular weight, 10 parts by weight of naphthalene was added. The mixture was taken up in carbon bisulfide and condensation was effected with 43 parts of aluminum chloride at room temperature. A portion of the product when added in concentration of 2% to Manchester Spindle Oil was insoluble in said oil, but after removal of this insoluble portion by filtration, the filtrate was clear and clean. The Manchester Spindle Oil originally had a pour point of $+30°$ F. and the filtrate had a pour point of $-30°$ F.

In the following claims the term "polymer" is used to describe an effective combination of the initial materials of heavy molecular weight in substantial quantities, that is to say, with molecular weights above about 600 and ranging through 1000 to 2000. These heaviest materials cannot be vaporized or only with very great difficulty, without decomposition. It is to be understood that if the materials are saturated they must be rendered unsaturated or else must be halogenated, or if they are unsaturated originally they may be polymerized as such.

My invention is not to be limited by any theory of the operation of the condensation, nor to the use of any particular starting materials, but only to the claims in which I wish to claim all novelty inherent in the process.

I claim:

1. An improved wax-modifying agent comprising essentially a polymer-condensation product resulting from the reaction of an alcohol having a carbon chain of at least 10 carbon atoms and containing a reactive group selected from the class consisting of olefin linkages and halogen atoms, with an aromatic compound containing replaceable hydrogen atoms in the aromatic nucleus selected from the class consisting of aromatic hydrocarbons and phenolic and amino derivatives thereof, said polymer being soluble in lubricating oil and having a molecular weight above 600.

2. An improved wax-modifying agent comprising essentially a polymer condensation product resulting from the reaction of an unsaturated aliphatic alcohol having the general formula ROH, where R is a hydrocarbon group of more than 10 carbon atoms, and an aromatic compound containing replaceable hydrogen atoms in the aromatic nucleus selected from the class consisting of aromatic hydrocarbons and phenolic and amino derivatives thereof, the polymer having a molecular weight above 600 and being soluble in lubricating oils.

3. An improved wax-modifying agent comprising essentially a polymer-condensation product resulting from the reaction of an unsaturated aliphatic alcohol having the general formula ROH, where R is a hydrocarbon group of more than 10 carbon atoms, and naphthalene, the polymer having a molecular weight above 600 and being soluble in lubricating oils.

4. An improved wax modifying agent comprising essentially a polymer-condensation product resulting from the reaction of oleyl alcohol and naphthalene, containing a substantial proportion of fractions having a molecular weight above 600 and soluble in lubricating oil.

5. Composition according to claim 1 in which the cyclic compound is a phenol.

6. Composition according to claim 1 in which the product is a polymer-condensation product of oleyl alcohol and phenol.

7. The process of preparing wax-modifying agents which comprises reacting an aliphatic alcohol having the general formula ROH, where the OH is an alcoholic hydroxyl group and R is a hydrocarbon chain of more than 10 carbon atoms containing a reactive group selected from the class consisting of olefin linkages and halogen atoms, with an aromatic compound containing replaceable hydrogen atoms in the aromatic nucleus and selected from the group consisting of aromatic hydrocarbons and phenolic and amino derivatives thereof, in the presence of a condensing agent of the Friedel-Crafts type, to produce a polymer-condensation product having a molecular weight above about 600, but stopping the reaction before rubbery products insoluble in hydrocarbon oils are formed, washing the reaction product with water or alkali to remove the condensing agent and recovering from the polymer-condensation product a fraction having a molecular weight above 600 and soluble in a hydrocarbon oil.

8. The process of preparing wax-modifying agents which comprises reacting a material comprising essentially oleyl alcohol with naphthalene in the presence of aluminum chloride as condensing agent, at about room temperature, stopping the reaction before rubbery products insoluble in hydrocarbon oils are formed, removing the aluminum chloride and distilling the condensation products under reduced pressure whereby a distillation residue is obtained consisting of heavy polymer-condensation products having a molecular weight above 600 and being soluble in hydrocarbon oils.

9. An improved wax modifying agent comprising a polymer-condensation product resulting from the reaction of a halogen-containing aliphatic alcohol having a chain of at least 10 carbon atoms, and an aromatic compound containing replaceable hydrogen atoms in the aromatic nucleus and selected from the group consisting of aromatic hydrocarbons and phenolic and amino derivatives thereof, said polymer-condensation product being soluble in lubricating oil and having a molecular weight above 600.

ANTHONY H. GLEASON.